Figure 1:
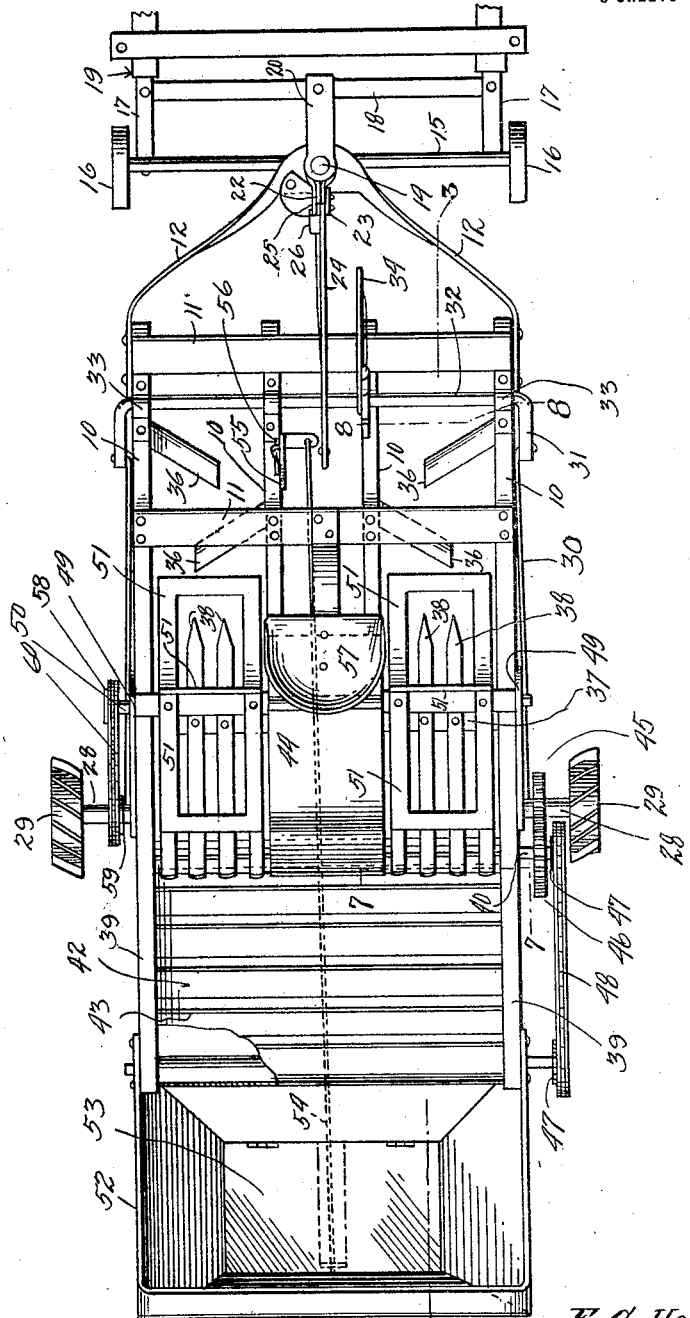

E. G. HOWARD & R. ALTMAN.
BEAN AND PEA HARVESTER.
APPLICATION FILED SEPT. 18, 1916.

1,212,061.

Patented Jan. 9, 1917.
3 SHEETS—SHEET 1.

Witnesses

Inventors
E. G. Howard
R. Altman
By Chandler & Chandler
Attorneys

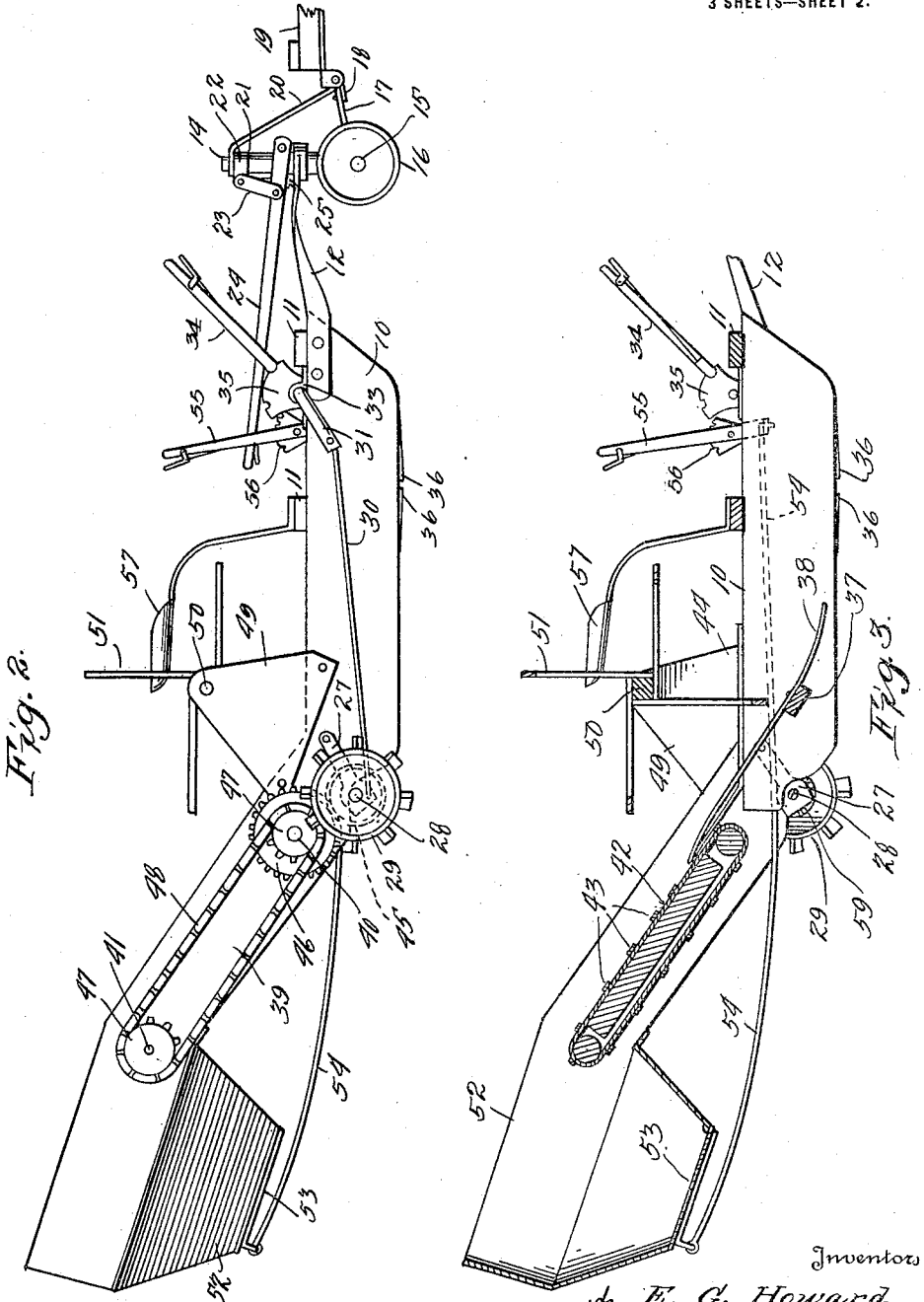

E. G. HOWARD & R. ALTMAN.
BEAN AND PEA HARVESTER.
APPLICATION FILED SEPT. 18, 1916.
1,212,061.
Patented Jan. 9, 1917.
3 SHEETS—SHEET 3.
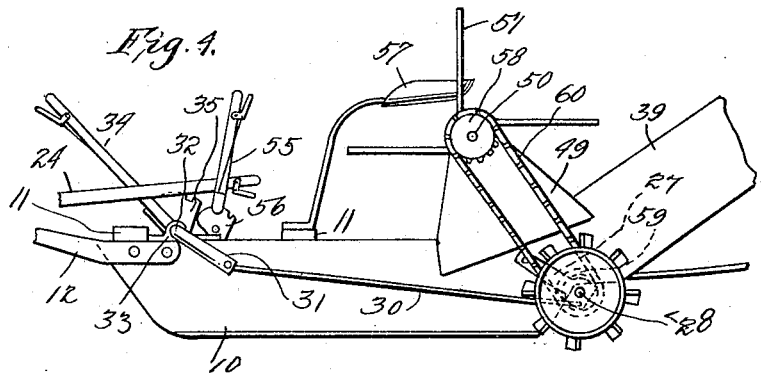
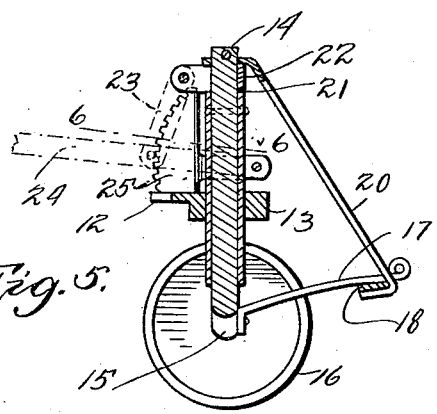
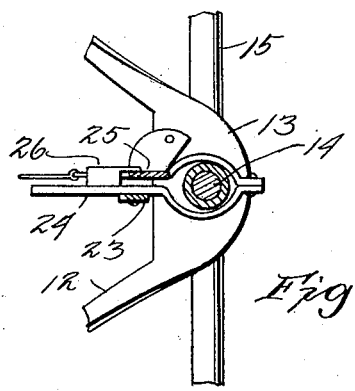
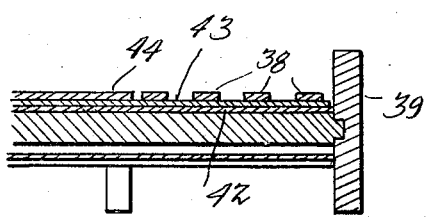
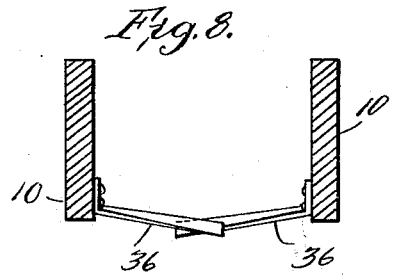
Witnesses
Inventors
E. G. Howard
R. Altman
By
Attorneys

UNITED STATES PATENT OFFICE.

EARL G. HOWARD AND ROY ALTMAN, OF RUSH, COLORADO.

BEAN AND PEA HARVESTER.

1,212,061.　　　　　　Specification of Letters Patent.　　　Patented Jan. 9, 1917.

Application filed September 18, 1916. Serial No. 120,748.

*To all whom it may concern:*

Be it known that we, EARL G. HOWARD and ROY ALTMAN, citizens of the United States, residing at Rush, in the county of El Paso, State of Colorado, have invented certain new and useful Improvements in Bean and Pea Harvesters; and we do hereby declare the following to be a full, clear, and exact description of the invention, such as will enable others skilled in the art to which it appertains to make and use the same.

This invention relates to agricultural machinery and has special reference to a bean and pea harvester.

One important object of the invention is to improve and simplify the general construction of devices of this character.

Another important object is to provide an improved arrangement of frame and a raising and lowering means therefor in devices of this character.

A third important object of the invention is to provide an improved arrangement whereby the frame of such a device will carry a conveyer which may be disconnected by the movement of the mechanism which elevates the frame and connected by the movement of the same mechanism which lowers the frame for operation.

A still further important object of the invention is to provide an improved arrangement of gathering fingers and conveyer in such devices.

A fifth important object of the invention is to provide an improved arrangement of gathering fingers and beaters or reels of this character.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and Figure 1 is a top plan view of a harvester constructed in accordance with this invention. Fig. 2 is a side elevation thereof. Fig. 3 is a section on the line 3—3 of Fig. 1. Fig. 4 is a fragmentary side elevation taken from the side opposite Fig. 2. Fig. 5 is a vertical section through the pivot connection of the front truck. Fig. 6 is a section on the line 6—6 of Fig. 5. Fig. 7 is a section on the line 7—7 of Fig. 1. Fig. 8 is a section on the line 8—8 of Fig. 1.

In carrying out the objects of the invention, there is provided a main frame which consists of a plurality of spaced pairs of sled runners 10 which are held in spaced relation by means of transverse members 11. Extending forward from the front ends of the outer runners 10 are brace members 12 which terminate forwardly in a bracket 13 wherein is pivotally and slidably mounted a truck center pin 14 which carries at its lower end a forward axle 15 having mounted on the ends thereof the forward ground wheels 16. Extending forwardly from the axle are the fixed draft members 17, these members connected by a cross bar 18. Pivotally connected to the members 17 is the draft rigging 19 which in the present instance is illustrated as being a pair of shafts suitably arranged for the employment of three horses. It will be obvious, however, that any other form of draft means desired may be attached to the members 17 without altering the construction or departing from the principles of the invention.

In order to properly brace the forward truck a brace 20 is employed which connects the center of the cross bar 18 with the top of the center pin or pivot 14. This center pin or pivot is provided intermediate its ends with a shipper groove 21 wherein is located a shipper ring 22 connected by means of a link 23 with a shipper lever 24 pivoted to a quadrant 25 fixed on the bracket 13. By means of this construction movement of the lever 24 will raise or lower the front of the machine while at the same time the pivoting of the front truck is not interfered with. The shipper lever 24 is provided with the usual latch 26 operating on the quadrant 25.

Pivoted to the rear ends of the outside members 10 is a pair of arms 27 wherein is journaled a shaft 28 carrying on its outer ends rear ground wheels 29 preferably provided on their peripheries with ground engaging elements. One of these wheels is fixed to the shaft while the other is preferably loose thereon to aid in turning corners. Connected to the arms 27 are links 30 which have their forward ends connected to the rock arms 31 of a rock shaft 32 extending across the front of the machine and journaled in bearings 33 on the member 10. On this rock shaft 32 is a rock shaft lever 34 of the usual latch type, the lever coöperating with a quadrant 35 fixed to one of the members 10. By means of this arrangement forward or backward movement of the handle of the lever causes swinging of the arms 27 so that the rear end of the main frame is raised or lowered.

Fixed to the lower edges of the members 10 are cutter knives 36 which are rearwardly and downwardly inclined and arranged in staggered relation as clearly seen in Figs. 1 and 8. Extending transversely of the members 10 to the rear of the cutter knives is a finger bar 37 whereto is connected each of the fingers 38, these fingers extending downwardly and forwardly from the bar at their front ends while their rear ends extend upwardly and rearwardly from said bar.

Extending upwardly and rearwardly from the rear ends of the outer members 10 is a pair of conveyer side frames 39 and journaled at the lower ends of these frames is a conveyer shaft 40 while a similar shaft 41 is journaled at the upper ends of the frames. These two shafts are of sufficient size between the frames to carry a conveyer belt 42 which is provided with transverse flights or slats 43, the belts and slats being so arranged that the lower and forward end of the belt lies beneath the upper and rearward ends of the fingers 38 and the slats bear against the undersides of these fingers as the belt is operated, the fingers being preferably of spring metal so that they are retained in close relation to the belt and slats at all times, thus preventing any material which may pass up the fingers from rolling back beneath them on the belt. Between the sets of fingers is interposed a guard plate 44 which closes in the space at the rear of the inner members 10.

Fixed on the shaft 28 is a gear wheel 45 which is arranged to mesh with a second gear wheel 46 mounted on the shaft 40, the two gear wheels being in mesh when the lever 34 is moved forward to permit the rear ends of the frame to drop while the gears are pulled away from each other and out of mesh when the lever 34 is moved rearward to raise the frame. Thus the frame is raised and the gears unmeshed with one movement while the frame is lowered and the gears meshed for operation with a second movement. Also fixed on the shafts 40 and 41 are conveyer sprockets 47 which are connected by means of a chain 48.

Extending upward from the outside members 10 are brackets 49 and journaled in these brackets is a reel or beater shaft 50 carrying the reel arms 51. It is to be noted that these arms 51 are of such length and so disposed that they successively pass between the members 10 on each side of the machine, these members thus acting as guards at the sides of said arms to prevent any of the material being pushed to one side or the other as it is moved up along the fingers 38, the fingers themselves acting as the bottom of the chute. Moreover, the fingers, as previously stated, being resilient, will yield and prevent breakage of the parts in the event of too much material or too hard material or other foreign matters getting between the blades of the reel and said fingers. To the upper end of the members 39 is fixed a hopper 52 having a door 53 in its bottom the door being hinged to the forward edge of the door opening and being connected by a link 54 with a lever 55 working on a quadrant 56. By means of this arrangement movement of the lever 55 will open or close the door at will and it is to be noted that the several levers are arranged close to the operator's seat 57 which is supported in the usual manner on the main frame.

In the operation of the device during its travel to the field the main frame is held in elevated position so that the conveyer is out of gear. However, the beater shaft, which carries a gear 58 connected to a gear 59 by a chain 60, the gear 59 being located on the shaft 28, may revolve freely at this time, without injury. Upon arriving at the field where it is desired to harvest beans or peas the levers are so manipulated as to drop the runners onto the ground. This causes the conveyer to be thrown into gear and the machine is then driven through the field in the usual manner, the knives cutting off the vines at or below the surface of the ground. These vines then pass up the gathering fingers, being assisted by the reels or beaters and are carried up the conveyer and dropped in the hopper. When the hopper has received a sufficient charge of vines the appropriate lever may be operated to open the door whereupon the vines are dropped in a mass upon the ground so that they may be readily gathered for placing in a cart or other vehicle. The door is then closed and the device driven further through the field this operation being repeated as many times as necessary to harvest all of the beans or peas.

It is to be noted that the transverse members 11, being on top of the members 10 assist in forcing the vines down so that they can readily pass between the pairs of members 10. It is to be noted that these transverse members 11 are of such length and the members 10 are so arranged with respect to such transverse members that two rows of peas or beans may be harvested at one operation, thus greatly expediting the harvesting of the field.

It will furthermore be noted that while the drawings accompanying this specification illustrate the parts as formed largely of wood, suitable rolled and plate metal and castings may take the place of any wooden part without requiring any rearrangement of the elements or any departure from the combination shown and described.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a bean harvester, a main frame, harvesting devices supported by the frame and including conveyer mechanism having a driving gear, a shaft swingingly connected to said main frame, ground wheels on said shaft, a gear on the shaft arranged to revolve with one of the wheels, and means to swing said shaft into position to raise the frame and move the gears out of engagement and to lower the frame and move the gears into engagement.

2. In a bean harvester, a main frame, a set of gathering fingers fixed adjacent their forward ends to the main frame and extending rearwardly and upwardly from their points of attachment, the rear ends of the fingers being free, a conveyer belt extending beneath said free ends and provided with transverse flights engaging the under sides of the rear ends of the fingers, and means to operate the conveyer belt.

3. In a bean harvester, a main frame, a set of gathering fingers fixed adjacent their forward ends to the main frame and extending rearwardly and upwardly from their points of attachment, the rear ends of the fingers being free, a conveyer belt extending beneath said free ends and provided with transverse flights engaging the under sides of the rear ends of the fingers, means to operate the conveyer belt, a reel working over the free ends of said fingers, and means to drive the conveyer and reel.

4. In a bean harvester, a main frame including spaced pairs of sled runners carrying cutter knives and gathering fingers, a wheeled truck supporting the forward ends of the runners, means to raise and lower said truck relatively to the frame, a shaft mounted on the frame to swing vertically with relation to said frame, ground wheels carried by the shaft, and means to swing the shaft with relation to the frame whereby to raise and lower the frame with respect to the ground.

In testimony whereof, we affix our signatures in the presence of two witnesses.

EARL G. HOWARD.
ROY ALTMAN.

Witnesses:
D. W. MUNDA,
C. A. MUNDA.

Copies of this patent may be obtained for five cents each, by addressing the "Commissioner of Patents, Washington, D. C."